United States Patent [19]

Lederman

[11] Patent Number: 4,908,869

[45] Date of Patent: Mar. 13, 1990

[54] INDUCTION-BASED ASSISTIVE LISTENING SYSTEM

[76] Inventor: Norman Lederman, 4 Collins Rd., Yarmouth, Me. 04096

[21] Appl. No.: 349,515

[22] Filed: May 9, 1989

[51] Int. Cl.$^4$ ............ H04B 5/00

[52] U.S. Cl. ............ 381/79; 455/41; 375/55

[58] Field of Search ............ 381/79; 455/41; 379/55

[56] References Cited

U.S. PATENT DOCUMENTS

| | | | |
|---|---|---|---|
| 2,252,641 | 8/1941 | Poliakoff et al. | 381/79 |
| 2,461,344 | 2/1949 | Olson | 381/77 |
| 2,976,419 | 3/1961 | Menke et al. | 250/358.1 |
| 3,495,213 | 2/1970 | Nahas | 379/55 |
| 3,996,518 | 12/1976 | Halstead et al. | 381/79 |
| 4,361,733 | 11/1982 | Marutake et al. | 381/79 |
| 4,489,330 | 12/1984 | Marutake et al. | 381/79 |

OTHER PUBLICATIONS

Olofsson, Karolinska Institutet, Dept. of Technical Audiology, Stockholm, Sweden, Report TA110, Jan. 1984, ISSN 0280-6819.

Bosman et al., A New Approach to a Space-Confined Magnetic Loop Induction System, IEEE Transactions on Audio, vol. A0-13, No. 3, May/Jun. 1965.

De Boer, Analytical Design of Magnetic Loop Induction Systems, IEEE Transactions on Audio, vol. AU-13, No. 3, May/Jun. 1965.

Gagnon, "Yarmouth Man Markets Loop for Better Hearing", MaineSay, Wednesday, Jan. 25, 1989, p. 19.

*Primary Examiner*—Forester W. Isen
*Attorney, Agent, or Firm*—Thomas L. Bohan

[57] ABSTRACT

A multiple-loop magnetic induction system for improving communication with the hearing-impaired or to people in general who wish to listen privately to speech or music while being in the company of others or at a public location. The invention uses a particular grid made up of several electrical conductors as a means of generating an audio-frequency magnetic field which in turn couples to the telephone coils already present in most hearing aid units. The audio-frequency magnetic field is correlated to sound waveforms—speech, music, etc.—which is to be communicated. The grid configuration is selected so as to produce an end signal which is substantially independent of the location and the orientation of the hearing aid device within the area of the grid and which falls off precipitously outside of the region defined by the grid. The conductors which make up the grid configuration are enveloped in a flexible, lightweight matting which can be unrolled in the area to be addressed.

13 Claims, 2 Drawing Sheets

INDUCTION-BASED ASSISTIVE LISTENING SYSTEM

BACKGROUND OF THE INVENTION

1. Field of the Invention

This invention relates to the field of systems for addressing hard-of-hearing persons, especially in a classroom or auditorium setting where a single speaker is addressing an audience of many listeners. More particularly, this invention relates to systems whereby communication to hard-of-hearing persons is mediated by an audio-frequency magnetic field generated by and correlated with the speech and other sounds to be communicated, said field being sensed by the small pick-up coil embedded in most hearing aid units. This invention furthermore constitutes a modular approach to an improved induction loop system, wherein the specific layout of a multiplicity of convoluted loops and the phases selected for the currents through said loops produce an ac magnetic field which is highly homogeneous throughout the target area, has minimal spillover beyond the target area, and which leads to a hearing aid response that is substantially isotropic, i.e., independent of the position and orientation of the hearing aids.

2. Description of the Prior Art

It is estimated the some 20,000,000 Americans have some form of hearing loss that affects their ability to understand the spoken word in certain listening situations. Approximately one in every five children has a hearing loss in one or both ears that is at least medically significant and as many as seven children per thousand have a hearing loss that is educationally or socially significant. Similarly, as the United States population grows older there will be more and more people with significant hearing loss.

Conduction-type hearing losses and certain nerve-type hearing losses can be at least partially remedied by the use of standard hearing aids which electronically amplify sound waves received at the ear. Traditionally, these systems have incorporated a sensor of sound waves, transducer means of converting the sound wave signal into an electric voltage, means of amplifying the electric voltage, and a second transducer for converting the amplified voltage back to sound waves which are then directed to the eardrum. Current hearing aid have the ability to increase sound intensity (amplitude) over the entire spectrum of normal speech frequencies; their circuitry may be also tailored so as to amplify only a particular frequency range and thus compensate for the specific hearing loss of a particular individual.

Unfortunately, hearing aids amplify unwanted sounds as well as desired sounds. Since one of the major problems confronting those who are even slightly hearing-impaired is that of differentiating the desired sound (the signal) from the undesired background sounds (the noise), universal amplification of all ambient sounds is highly undesirable; it does not increase the signal-to-noise ratio. The hearing aid which provides assistance in a one-to-one conversation does not work nearly as effectively in the classroom, the theater, or on the job. Thus, without further advances, the traditional hearing aid does not effectively remove the barrier which exists between the hearing-impaired person and his or her education, employment and recreation. Since on of our societal goals is to provide all physically-handicapped persons with access to such facilities and activities which is equal to that of the population as a whole, there is great pressure to go further in the enhancement of signal-to-noise ratios for the hearing-impaired person listening to speech and other sounds in public places such as schools, museums, concert halls, etc. In a sense, these efforts can be characterized as being directed toward the creation of a "barrier-free environment" for the hearing-impaired.

As a practical matter, creating this barrier-free environment has to be done without burdening hearing-impaired persons with cumbersome equipment and without interfering with the listening efficiency and enjoyment of people with more acute hearing. The three general approaches are currently in use for addressing hearing-impaired individuals in a classroom or auditorium setting can be characterized as follows.

1. Radio transmission (commonly referred in the field as "frequency modulation" systems although some set-ups utilizing amplitude modulation are in use), wherein the audio-frequency signal to be conveyed is used to modulate a radio-frequency carrier wave being transmitted to special receivers located near each individual to be addressed. This modulated transmission is demodulated by the receiver system and the resulting audio-frequency wave fed into the hearing aid or earphone of said individual.

2. Light transmission (also referred to as "infra-red systems" or "infra-red modulation"), wherein the audio-frequency signal to be conveyed is used to modulate infra-red beams which are then picked up by special receivers located near the individuals to be addressed. In principle, this is the same as Approach 1 above, just the frequency of the electromagnetic carrier is changed.

3. Audio-frequency magnetic fields (created by what are generally referred to as Induction Loop Systems), wherein audio-frequency magnetic fields correlated with the sounds to be conveyed are created directly at the location of the individual to be addressed. These magnetic fields then induce audio-frequency voltages in the pick-up coils already embedded in most hearing aids, audio-frequency voltages which after amplification enter a transducer which directs sound waves to the ear of the listener.

Each of these approaches as currently used has serious disadvantages. The first one, radio transmission from the speaker to the audience—effectively a closed-circuit radio broadcast with the room—requires rather expensive transmitting equipment and requires that the hearing aid (by itself or enhanced with other electronic equipment) be capable of receiving radio signals, a requirement which leads to cumbersome and obtrusive equipment near the listener. Furthermore, there exists the potential for "crosstalk" if the listener is in the vicinity of two radio transmission systems operating at the same carrier frequency. It is true that in fixed school building contexts, the radio transmission system is set up to operate on several different carrier frequencies and in this way adjacent classrooms can utilize the system concurrently. This does require that the listener know what frequency to have his or her receiver tuned to. Although this may not be a burden when the listener continues to return to the same classrooms, and listening systems, it does limit the use of radio transmission systems for general purpose applications where the listener may not be able to prepare in advance to receive the frequency in use. On the other hand, attempts to standardize the transmitting frequency lead back to problems with crosstalk with consequent deterioration in signal resolution for the listener.

Although the infrared light transmission system—relying on a directed (and easily contained) electromagnetic wave—does not have the "spillover" problems inherent in the radio transmission method, it still requires transmission and receiving equipment which is obtrusive and calls attention to the listener. Moreover, and unlike the situation with the radio transmission system, the listener has to ensure that his or her detector is out in the open and in the line of sight with the light source. Additionally, infrared tends not to work well in bright sunlight, presumably because the infrared component of the sunlight saturates the receiver/demodulator units.

Because it can utilize a detector already present in most hearing aids with no need of external receiver/-demodulator electronics, the induction loop system (ILS) technology has been more widely used throughout the work that either of the other two. Its convenience of implementation grew out of the realization that telephone receivers produce externally-detectable audio-frequency magnetic fields correlated to the speech patterns being received by the telephone. This realization led to the introduction into hearing aids of tiny pick-up coils and the related circuitry needed to detect and amplify the telephone-generated magnetic field signal and then to convert it back into a sound signal to be directed toward the eardrum. In order to activate the pick-up coil detector (and to deactivate the straight sound wave detection/amplification system in the hearing aid) the user simply flips a switch on the hearing aid unit. This is typically what will be done when the hearing aid user is conversing on the telephone. Of course, once the pick-up coil (the telephone coil or "T-coil") circuitry was in place it could be used for more general communication with the hearing-impaired, and in particular any communication mediated by an audio-frequency magnetic field established at the location of the hearing aid.

Generating the required audio-frequency magnetic field can be done most simply by placing a planar conducting wire loop around the area or room in which the target audience is located, a loop which is energized by an audio-frequency current generated electronically from, and correlated with, the speech and other sounds to be communicated. More particularly, that current is generated by a simple microphone/amplifier/speaker output circuit in which the conducting loop replaces the speaker. A horizontal planar loop results in a predominantly vertical ac magnetic field being generated inside the loop, which is where the audience would be intended to sit or stand. Unfortunately, disadvantages to the basic ILS exist which counter the simplicity of design and universality of application. For one thing, the spillover problem is significant; as a distance from the loop equal to half the loop's width the audio-frequency magnetic field strength remains equal to half the maximum amplitude *within* the loop. When one combines this slow dropoff with the logarithmic response of the human ear, it can be seen that the single-loop ILS is unusable for addressing audiences in adjacent rooms within a building, a real limitation when setting up communication systems within the school building setting, especially for a school attended primarily by the hearing-impaired. Even in thise exceptional circumstances where spillover might not need to be considered—for example, buildings with a single large auditorium—one must still confront the high degree of directionality (anisotropy) in the signal received. This follows from the fact that at a given location within the loop the ac magnetic field generated oscillates back and forth in a specific fixed direction. In the center of the loop this direction is close to vertical (at locations not far above the plane of the loop). A maximum signal is induced in the T-coil of the hearing aid when the plane of the T-coil is perpendicular to said fixed direction of the ac magnetic field (which near the center of the loop would occur when the listener was holding his or her head upright). Conversely, the induced signal is zero when said plane is oriented so as to include said fixed direction. This means that whenever the listener nods or tilts his or her head the sound received by this technique varies in intensity, actually falling to zero for certain orientations. More specifically, these effects occur for the listener at the center of the loop when said listener rotates his or her head about any other axis than the vertical. At each location in the loop there will be one and only one axis of symmetry as far as reception of the signal is concerned. Near the edges of the loop, that axis will be approximately horizontal (and oriented perpendicular to the wire constituting that side of the loop). A further disadvantage of the simple ILS is fluctuation which occurs in the signal reception amplitude as the listener moves about within the loop, even though the hearing aid orientation and height above the floor remain constant. This fluctuation occurs because of the change in both amplitude and direction of the audio-frequency magnetic field as one moves about within the loop. A final major impediment to the wider use of ILSs—one *not* present with the radio and infrared systems—is the need to lay the loop out with care each time it is installed or moved from one room to another. A nuisance when one is dealing with a single loop, this need creates significant problems when one is working with the more complicated loop arrays to be discussed below.

Even in this instance, one might be concerned about spillover affecting hard-of-hearing persons near to the auditorium who have their hearing aids switched to the T-coil in order to use a telephone.

In an early attempt to deal with spillover, the single loop was folded so that it had a series of rectangular lobes. This greatly reduced spillover since (1) it permitted a lower current to be used (the convolution of the loop ensures that all regions are close to the current-carrying wire) and (2) it resulted in partial cancellation of the audio-frequency magnetic field away from the target area. Unfortunately, it greatly increased the non-uniformity of the vertical component of the ac magnetic field *within* the target area. To address *that* problem, a second multilobe loop was introduced—and energized by a current identical to that in the first loop except for its phase, which was shifted by ninety degrees. This additional modification restored the uniformity of the magnetic field amplitude which had existed within the large single loop. See, for example, *A New Approach to a Space-Confined Magnetic Loop Induction System,* D. Bosman and L. J. M. Joosten, IEEE Transactions on Audio, Vol. AU-13 May/June 1965. Note that when Bosman and Joosten use the term "multi-loop system," they are referring to a single loop with a number of lobes. What they describe in the referenced paper is a system with two such loops, oriented parallel to one another and powered by currents wave forms which are identical except for their respective phases, which differ by ninety degrees. (U.S. Pat. No. 4,361,733, Marutake et al., November 1982, incorporates and describes the approach of Bosman and Joosten.) This early attempt to salvage the ILS did not address the problems of anisotropy and complexity of installation. The "dead zones" which Bosman and Joosten sought to eliminate were those area where the *vertical* component of the audio-frequency magnetic field fell to zero. They did not address the fact that if the system is limited to utilizing just the *vertical* component of the induction field then, throughout the target area, the listener can lose the signal completely for a wide range of pick-up coil orientation. In other words, the system of Bosman and Joosten still leaves "dead *angles*," angles of the hearing aid for which no signal is received.

U.S. Pat. No. 4,489,330, Marutake et al., December, 1984, addresses the anisotropy problem, but approaches it from the direction of the hearing aid rather than that of the loop system. Recognizing that with all of the previously-available Induction Loop Systems there was a serious anisotropy problem, these inventors disclosed modified pick-up coil circuitry for the hearing aid itself. With a multiplicity of hearing aid pick-up coils, each oriented at a different angle and electrically coupled with one another, it is possible to largely overcome the anisotropy in the audio-frequency magnetic field set up by the ILS. That is, U.S. Pat. No. 4,489,330 of Marutake et al. takes the ILSs as described in the prior art and re-designs the receiving device, the hearing aid, so as to partially overcome the deficits in existing ILSs. Unfortunately, this approach has the serious drawback of requiring the many listeners to modify their systems, instead of modifying the single system of the speaker so as to take full advantage of the hearing aid circuitry already in place.

Further work with the two-loop system resulted in the second multi-lobe loop being physically oriented so that the horizontal components of the audio-frequency magnetic fields generated by the two loops were generally perpendicular to one another. (The ninety-degree phase difference between the currents in the respective loops was maintained. In addition, the multi-lobe deployment of each of the two loops is maintained so as to minimize spillover.) See *Improvements of Induction Loop Field Characteristics Using Multi-Loop Systems with Uncorrelated Currents,* by Ake Olofsson, Report TA110, Karolinska Institutet Dept. of Technical Audiology (January 1984). Some decrease in anisotropy results, since with the two currents physically and electrically orthogonal to one another the resultant audio-frequency produces two axes of symmetry about which the T-coil can be rotated without changing the signal received. This enables the listener in the center of one of the sub-loops to turn his head about a vertical axis and also to nod his head about a single horizontal axis without suffering a great reduction in signal. Nevertheless, there remain dead angles at all locations in the target area. Furthermore, the installation of this orthogonal loop system is fairly demanding, something which in general cannot be done by the end user if optimum design results are to be approached. Obviously, any system which requires a great deal of effort to set up will encounter resistance amoung those responsible for purchasing and installing it.

In spite of the title, this paper islimited to a discussion of systems with two loops, each of which is deployed with multiple lobes. At its conclusion it conjectures about possible benefits of using more than two loops, but provides no design suggestions or technical studies of such systems. Olofsson also alludes in passing to the use of a time-delay in place of the phase shift.

In summary, the really successful implementation of an Induction Loop System awaits design which will produce a signal which is (1) localized (minimal spillover), (2) homogeneous (minimal signal variation as one moves around the target area) and (3) isotropic (minimal signal variation as one changes the orientation of the hearing aid). It must also incorporate a loop configuration which is easily installed and easily moved from one room to another. The present invention makes important advances in all four of these areas when compared with the prior art.

The current invention uses a new configuration of induction loops and phase shifts that produce a magnetic field capable of inducing in a pick-up coil a voltage that is substantially uniform in strength regardless of the orientation of the pick-up coil. The configuration also results in the generation of a magnetic field whose strength decreases rapidly outside of the boundaries of the induction loops, thus allowing the inventor's system to be set up in adjacent rooms without the complication of cross-talk. Finally, the present invention utilizes a flexible mat in which the loop configuration is embedded, thus permitting easy deployment of the communication system.

SUMMARY OF THE INVENTION

The underlying invention is two-fold. On the one hand the Induction Loop System disclosed introduces a specific new multiple-loop configuration which when energized by similar currents mutually time-shifted by certain amounts generates an ac magnetic field which is highly localized and so structured so as to give rise to a signal which is both homogeneous and isotropic throughout a defined target area. On the other hand, the multiple-loop system disclosed is incorporated into a mat matrix which can be rolled up like a rug and transported as a unit to the room where it is to be installed; thus the need for a tedious, time-consuming deployment of the loop system is eliminated and a modular approach to "looping" rooms of varying dimensions is introduced.

The best results with respect to homogeneity are obtained by using pairs of individually energized loops. Each individual loop is arranged to have a series of sub-loops, rectangular in shape, with the long dimensions of all the rectangular sub-loops parallel to one another. The other loop of the pair is similar, and has its subloops oriented in the same way as the first member of the pair, but displaced from the first set of sub-loops by some fraction of the width of an individual sub-loop. In order to significantly reduce the anisotropy of signal detection, at least two such pairs are needed, the second pair being deployed so that all of its sub-loops are physically rotated by ninety degrees with respect to those of the initial pair. (Balancing cost versus sound quality, a single pair of loops can be used in conjunction with an individual loop oriented so that its sub-loops are positioned at right angles with respect to the sub-loops of the pair. With a proper distribution of power and selection of time delays, this minimal system can greatly reduce the anisotropy of signal detection; nevertheless, the homogeneity of signal detection as well as its isotropy suffer in comparison with the configuration which utilizes a (second full pair.)

The best results with respect to isotropy of signal are obtained when the currents in the individual loops are shifted from one another by times intervals on the order of milliseconds. (Use of a delay of greater than about 16 to 20 milliseconds results in a chorusing effect in the detected signal whereas use of a delays much less than a few milliseconds results in anisotropic signal detection thus eliminating the advantages of the present invention.) Each individual loop is powered separately, so that, for example, with two pairs, one will need four separate circuits for supplying current and three time shifters so as to ensure that the audio-frequency magnetic fields produced by the respective loops are separated from one another in the time domain.

The system comprises known transducer means for converting a sound-wave input signal into a corresponding electric voltage signal, known means for separating the electric voltage signal into a multiplicity of current signals, electrical delay means for delaying the current signals with respect to the reference signal by times on the order of milliseconds, and known means for connecting said current signals to said separate loops. The conduction loops are all affixed to a mat or sandwiched between a pair of mats that can easily be laid on the floor of the room in which the the audience is to be addressed, or which can constitute one of a set of such mats. Only the connections by which the individual loops are connected to the rest of the electronics extend outside of the mat.

The time delay approach used by the invention to separate the four audio-frequency magnetic fields appears to have an advantage over the use of phase shifting. Any sound waveform, no matter how complex, can be resolved into a collection of pure sinusoidal waves, each with a well-defined frequency—the so-called Fourier components of the complex waveform. with the time delay method utilized in the present apparatus, each of the individual Fourier components is delayed by the same time interval, which means that the entire waveform (the packet of the individual Fourier components) is delayed intact. In contrast, the use of the typical phase shifter device will delay each Fourier component by the same phase, with the result that there can be more distortion in the end signal.

PREFERRED EMBODIMENT OF THE INVENTION

Figure 1:
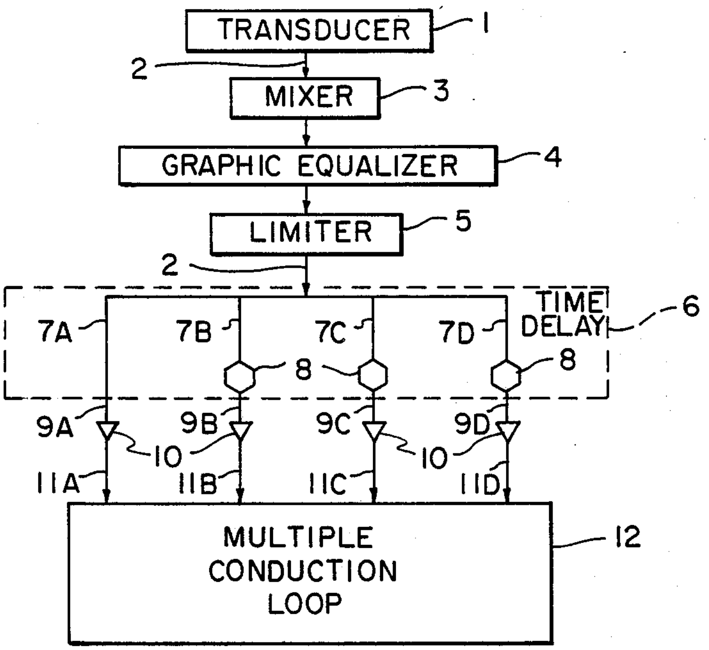
FIG. 1 is a block diagram of the preferred embodiment of the multi-loop induction hearing aid system.

A block diagram of the preferred embodiment of the multi-loop induction hearing aid system is shown in FIG. 1. An input transducer 1 converts an input signal (either live or prerecorded voice or music) into an electrical voltage signal 2. Said electrical voltage signal is conditioned seriatum by an audio mixer 3, a graphic equalizer 4, and a signal limiter 5 before being fed into a digital delay device 6. Said digital delay device 6 first splits said electrical voltage signal 2 into four separate but substantially equivalent signals 7A–D. Said signals 7A–D are then subjected to delay circuitry 8 of said digital delay device 6. Said signal 7A is delayed by zero milliseconds, said signal 7B by four milliseconds, said signal 7C is by six milliseconds, and said signal 7D by eight milliseconds. Delayed signals 9A–D (even though said signal 7A is not subjected to delay, it is helpful to include it in this grouping) are amplified by a four-channel amplifier 10, the output of which comprises four delayed, amplified voltage signals 11A–D, which are connected to a set of leads protruding from a multiple conduction loop array 12 which defines a square approximately twelve feet on a side. The net result is that all of the individual electrical signals and Fourier components therein are time shifted relative to one another. This inherently results in corresponding Fourier components in different time shifted signals being phase shifted by different amounts (not considering the possible equivalency of phase angles when multiples of 2 pi radians are subtracted, as would be done if one were computing arguments for trigonometric functions.

Figure 2A:
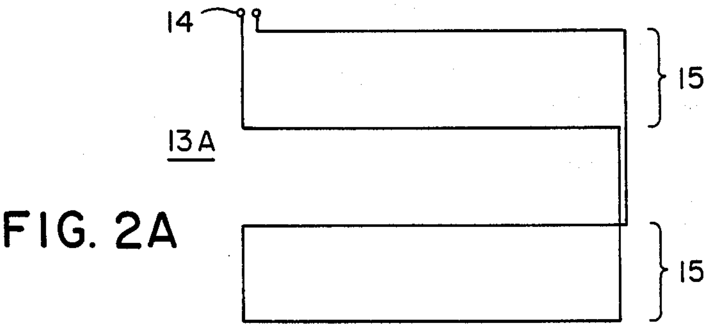
FIG. 2A shows the outline of the first of four individual conduction loops in the preferred embodiment.
Figure 2B:
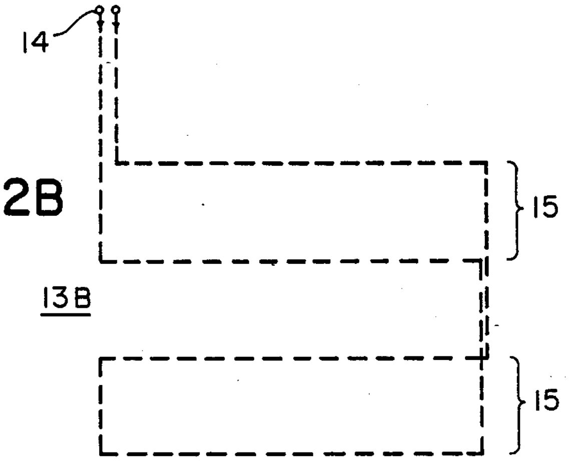
FIG. 2B shows the outline of the second of four individual conduction loops in the preferred embodiment.
Figure 2C:
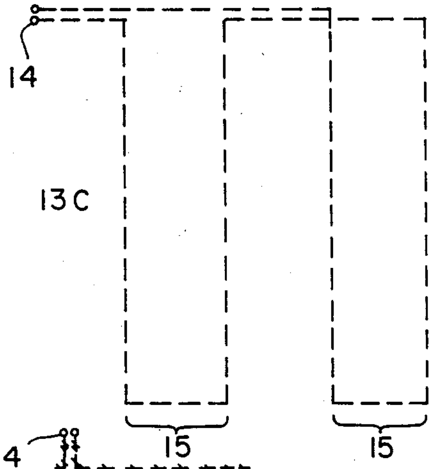
FIG. 2C shows the outline of the third of four individual conduction loops in the preferred embodiment.
Figure 2E:
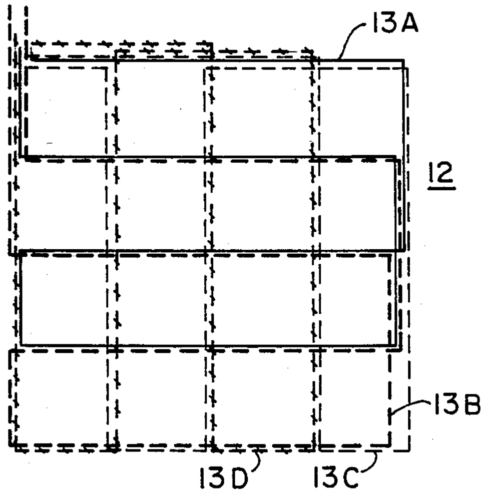
FIG. 2E shows the composite of the four individual loops as they are arrayed together within a mat in the preferred embodiment.
Figure 2D:
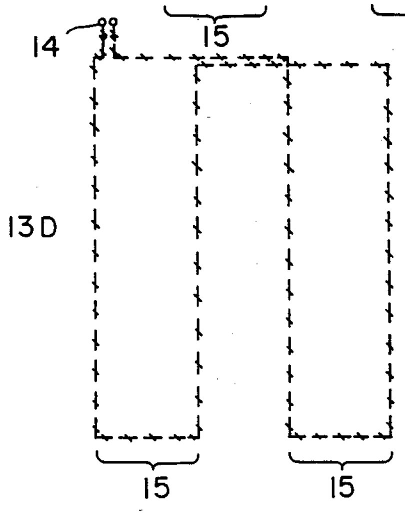
FIG. 2D shows the otline of the fourth of four individual conduction loops in the preferred embodiment.

FIG. 2A shows a first individual conduction loop 13A, FIG. 2B shows a second individual conduction loop 13B, FIG. 2C shows a third individual conduction loop 13C, and FIG. 2D shows a fourth individual conduction loop 13D. In the preferred embodiment, the conductor used for each of said individual conduction loops 13A–D is 20-gauge stranded wire with nylon-clad PVC insulation. Said individual conduction loops 13A–D are shown as they appear, respectively, before being incorpoated into said multiple conduction loop array 12. Associated with each of said conduction loops 13A–D is a pair of connectors 14. Electrical connections are made to said pairs of connectors 14 so that voltage signal 11A is connected to individual conduction loop 13A, voltage signal 11B is connected to individual conduction loop 13B, and so one. When said individual conduction loops 13A–D are combined in said multiple conduction loop array 12, said pairs of connectors 14 from the respective individual conduction loops 13A–D are in close proximity, though electrically isolated from one another. Viewing FIGS. 2A–D with this proximity constraint in mind, it is possible to envision to relative orientations and relative displacements of said individual conduction loops 13A–D with respect to one another.

In the preferred embodiment, each of said individual conduction loops 13A–D comprises a pair of rectangular sub-loops 15 connected by a narrow section where the wires making up the loop run side-by-side. Each of said sub-loops 15 is further defined as having its length dimension equal to about four times its width dimension, which in the preferred embodiment means that said sub-loops 15 each define rectangles twelve feet long and three feet wide.

Said individual conduction loops 13A–D are associated pairwise, a first pair comprising said first individual conduction loop 13A and said second individual conduction loop 13B and a second pair comprising said third individual conduction loop 13C and said fourth individual conduction loop 13D. Said first pair of individual conduction loops 13A and 13B is arranged such that the respective sub-loops 15 of said first conduction loop 13A are oriented parallel to said sub-loops 15 of said second conduction loop 13B, and are physically displaced by a distance equal to the width dimension of a single sub-loop 15. Said second pair of individual conduction loops 13C and 13D is arrayed similarly but rotated physically by ninety degrees with respect to said first pair of individual conduction loops 13A and 13B.

Figure 3:
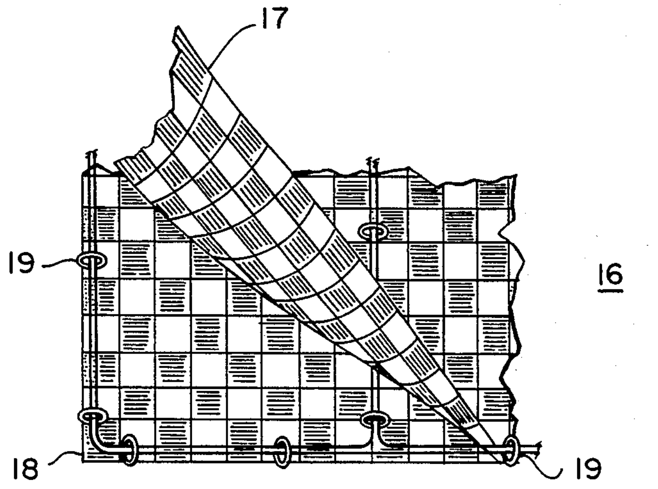
FIG. 3 shows a detail of the mat construction, showing a corner of the mat in the preferred embodiment with portions of two individual loops included.

FIG. 2E illustrates said multiple conduction loop configuration 12 defined collectively by said individual conduction loops 13A–D. Said multiple conduction loop configuration 12 is bound into a flexible mat 16. In the preferred embodiment, said flexible mat 16 is comprised of a top layer 17 and a bottom layer 18 of elastomer-coated nylon mesh carpet pad material, wherein said top layer 17 is combined with said bottom layer 18 in such a way as to envelop said multiple conduction loop array 12 in a sandwich-like configuration. FIG. 3 illustrates a detail of said flexible mat 16 in combination with said multiple conduction loop array 12. Said multiple conduction loop array 12 is fastened to said flexible mat 16 using any appropriate fastening means known in the art. In the preferred embodiment, said fastening means are "hog ring" fasteners 19. Said multiple conduction loop array 12, because its described permanent mounting on said flexible mat 16, is mobile and can be rolled out on the floor before the arrival of an audience and removed and stored at other times.

The location of the target audience's listening devices is directly above said flexible mat 16, at heights ranging from zero to approximately three feet. With the present invention, the magnetic field amplitude at a fixed height above said flexible mat 16 is essentially constant, not varying by more than ±0.5 dB. This constancy also pertains to varying the orientation of the listening device about any axis and by any amount. In contrast, the amplitude of the audio-frequency magnetic field declines sharply away from the target space, both for lateral and vertical displacements. At a height of one yard above said flexible mat 16 in the preferred embodiment and at a lateral displacement of two feet from the outer edge of said flexible mat 16 said amplitude is 20 dB lower than it is in the area directly above said flexible mat 16. Additionally, there is a rapid fall-off as one moves upward or downward with respect to the target space, the region directly above said flexible mat 16. In particular, at an elevation of nine feet elevation above said flexible mat 16, said amplitude is down by 43 dB from its level directly on said flexible mat 16 (zero elevation); furthermore said amplitude at nine feet above said flexible mat 16 is down by 23 dB from its level at three feet elevation, the upper height of the normal target region. Consequently, the Induction-Based Assistive Listening System as described in this preferred embodiment can be installed and used in rooms which are adjacent to one another, either displaced laterally on the same floor or one above the other. Furthermore, the modular aspect of said flexible mat 16 containing said multiple conduction loop array 12 simplifies the enlargement of the communication system to encompass a large auditorium space.

Although the present invention has been primarily with reference to the preferred embodiment, workers skilled in the art will recognize that changes may be made in form and detail without departing from the spirit and scope of the invention.

What I claim is:

1. A system for addressing hearing-impaired persons within a targeted audience by the generation of specifically configured audio-frequency magnetic field at pickup coils worn by said hearing-impaired persons comprising:

(a) transducer means for converting an acoustic signal into an electrical voltage signal possessing substantially the same Fourier spectrum as said acoustic signal;

(b) means for dividing said electrical voltage signal into a multiplicity of identical electric voltage signals;

(c) time delay means for introducing various discrete delay times into each of said multiplicity of identical electric voltage signals so as to produce a multiplicity of delayed electrical voltage signals;

(d) means to amplify each of said delayed electrical voltage signals;

(e) a grid of electrical conductors embedded in a flexible mat wherein said mat comprises:

(i) a bottom layer of flexible material;

(ii) a top layer of flexible material;

(iii) means for fastening said top layer over said bottom layer so as to sandwich said grid between said top layer and said bottom layer.

and said grid comprises a planar arrangement of least one pair of electrically isolated conduction loops, each of said conduction loops further comprising an electrically-linked plurality of substantially uniform, substantially rectangular sub-loops, each rectangular sub-loop having a length dimension equal to approximately four times its width dimension and further where all of said sub-loops of one member of a given pair of said conduction loops are arrayed so as to have their long sides parallel to the long sides of all of said sub-loops of the other member of said pair and are further arranged so that each of said sub-loops of one member of said pair is displaced along its width dimension by a distance equal to one-half the magnitude of said width dimension from the nearest sub-loop belonging to the other member of said pair of electrical conductors; and (e) means for connecting each of said time-delayed electrical voltage signals to a single one of said conduction loops so as to generate a single current in said single one of said conduction loops such that the current variation produces the same waveform which was associated with said acoustic waveform and where current amplitude produces an audio-frequency magnetic field amplitude of approximately 100 ma/meter at an elevation of 0.5 meters above said mat.

2. A system for addressing a selected audience of hard-of-hearing persons by the generation of specifically configured magnetic fields in the vicinity of pickup coils worn by said audience comprising:

(a) transducer means for converting an input signal into an electrical voltage singal processing substantially the same Fourier spectrum as said input signal;

(b) means for separating said electrical voltage signal into a multiplicity of current signal, phase shifted with respect to one another, in which each Fourier component of a particular member of said multiplicty of current signals has a unique phase shift with respect to the corresponding Fourier component in each of the other members of said multiplicity of current signals;

(c) an essentially planar arragement of substantially rectangular, electrically isolated conduction loops, each of said conduction loops having a length dimension and a width dimension, said conduction loops further arranged such that there exists a first loop which has an orientation with respect to said first loop's length dimension and at least one additional conduction loop which has an orientation with respect to said additional loop's length dimension which is essentially perpendicular to said orientation of said first loop and a further conduction loop which has an orientation with respect to said further loop's length dimension which is essentially parallel to said orientation of said first loop such that magnetic fields induced by current flowing through said conduction loops are of substantially uniform strength in a plane parallel to said mat when measured in an area above said conduction loops, but said magnetic fields are of substantially reduced strength outside of the area of said conduction loops; and (d) means for connecting each of said phase-shifted current signals to a separate conduction loop of said arrangement of conduction loops, wherein a voltage signal corresponding to said input is induced in said pick-up coils of said audience.

3. The system of claim 2 in which each of said conduction loops is configured in the form of a plurality of substantially rectangular sub-loops, each sub-loop having a length dimension greater than a width dimension.

4. The system of claim 3 in which all of the sub-loops have the same dimensions.

5. The system of claim 4 in which said length of said sub-loops is about for times that of said width of said sub-loops.

6. The system of claim 4 in which said sub-loops of essentially parallel conduction loops are arranged in pairs such that the sub-loops of a first conduction loop physically correspond with a second conduction loop displaced longitudinally by one sub-loop.

7. The system of claim 2 in which said conduction loops are arranged in pairs.

8. The system of claim 2 in which said transducer means comprises a microphone.

9. The system of claim 2 in which said arrangement of conduction loops are contained in a flexible mat.

10. The system of claim 9 in which said flexible mat is of lightweight construction.

11. the system of claim 2 in which said means for separating said electric voltage signal comprises an electronic digital delay.

12. A modular system for addressing a selected audience of hard-of-hearing persons by the generation of specifically configured magnetic fields in the vicinity of pick-up coils worn by said audience comprising:

(a) transducer means for converting an input signal into an electrical voltage signal processing substantially the same Fourier spectrum as said input signal;

(b) means for separating said electrical voltage signal into a multiplicity of current signals, phase shifted with respect to one another, in which each Fourier component of a particular member of said multiplicity of current signals has a unique phase shift with respect to the corresponding Fourier component in each of the other members of said multiplicity of current signals;

(c) a plurality of flexible mats comprising:

(i) a bottom layer of flexible material;

(ii) An essentially planar arrangement of at least three substantially rectangular, electrically isolated conduction loops, each of said conduction loops having loops further arranged such that there exists a first loop which has an orientation with respect to said first loop's length dimension and at least one additioal conduction loop which has an orientation with respect to said additional loop's length dimension which is essentially perpendicular to said orientation of said first loop and a further conduction loop which has an orientation with respect to said further loop's length dimension which is essentially parallel to said orientation of said first loop such that magnetic fields induced by current flowing through said conduction loops are of substantially uniform strength in a plane parallel to said mat when measured in an area above said mat, but said magnetic fields are of substantially reduced strength outside of the area of said mat; and (iii) a top layer of flexible material; and (d) means for connecting each of said phase-shifted current signals to a separate conduction loop of said arrangement of conduction loops, wherein a voltage signal corresponding to said input signal is induced in said pick-up coils of said audience.

13. A method of addressing a selected audience of hard-of-hearing persons by the generation of specially configured magnetic fields in the vicinity of pick-up coils worn by members of said audience comprising:

(a) converting an input signal into an electrical voltage signal possessing substantially the same Fourier spectrum as said input signal;

(b) separating said electrical voltage signal into a multiplicity of current signals, phase shifted with respect to one another, in which each Fourier component of a particular member of said multiplicity of current signals has a unique phase shift with respect to the corresponding Fourier component in each of the members of said multiplicity of current signals;

(c) conducting each of said current signals into a corresponding electrically isolated conduction loop, each conduction loop having a substantially rectangular configuration and a length dimension and a width dimension, wherein a voltage signal corresponding to said input signal is induced in said pick-up coil of a member of said audience, said conduction loops situated in an essentially planar configuration such that there exists a first conduction loop which has an orientation of said first loop and at least one further conduction loop which has an orientation with respect to said first loop's length dimension and at least one additional conduction loop which has an orientation with respect to said additional loop's length dimension which is essentially perpendicular to said orientation with respect to said further loop's length dimension which is essentially parallel to said orientation of said first loop such that magnetic fields induced by current flowing through said conduction loops are of substantially uniform strength in a plane parallel to said mat when measured in an area above said conduction loops, but said magnetic fields are of substantially reduced strength outside of the area of said conduction loops.

* * * * *